United States Patent [19]
Sasaki et al.

[11] Patent Number: 5,355,635
[45] Date of Patent: Oct. 18, 1994

[54] POWER-DRIVEN CUT-OFF MACHINE

[75] Inventors: Katsuhiko Sasaki, Chita; Masaki Kondo, Haza, both of Japan

[73] Assignee: Makita Corporation, Anjo, Japan

[21] Appl. No.: 971,889

[22] Filed: Nov. 4, 1992

[30] Foreign Application Priority Data

Nov. 5, 1991 [JP] Japan .................. 3-318482

[51] Int. Cl.⁵ ................................ B24B 41/00
[52] U.S. Cl. .................. 451/461; 451/490; 83/471.2; 83/490
[58] Field of Search .......... 51/33 R, 35, 347, 166 FB, 51/166 R, 170 PT; 125/13.03, 14; 83/490, 471.2

[56] References Cited

U.S. PATENT DOCUMENTS

| | | |
|---|---|---|
| 1,746,594 | 2/1930 | Jacobson .................... 83/490 |
| 2,388,434 | 11/1945 | Phillis ....................... 51/98 R |
| 2,855,733 | 10/1958 | Allison ...................... 51/33 R |
| 3,053,018 | 9/1962 | Tracy . |
| 3,089,287 | 5/1963 | Dilks ........................... 51/35 |
| 3,325,946 | 6/1967 | Lange ........................ 51/33 R |
| 4,062,151 | 12/1977 | Hjalmarson ................. 51/47 |
| 4,085,547 | 4/1978 | Lawson et al. ............. 51/47 |
| 4,094,102 | 6/1978 | Lauze et al. ............... 51/33 R |
| 4,236,356 | 12/1980 | Ward ......................... 125/14 |
| 4,402,241 | 9/1983 | Moores, Jr. ................ 83/478 |
| 4,428,159 | 1/1984 | Sigetich et al. ........... 125/13.03 |
| 4,765,098 | 8/1988 | Duff ........................... 83/490 |
| 4,817,581 | 4/1989 | Trentadue ................. 125/14 |
| 5,016,510 | 5/1991 | Gardner ................... 83/471.002 |

FOREIGN PATENT DOCUMENTS

| | | |
|---|---|---|
| 884163 | 7/1953 | Fed. Rep. of Germany ........ 51/170 |
| 2133308 | 1/1973 | Fed. Rep. of Germany . |
| 1370626 | 7/1964 | France ..................... 51/35 |

*Primary Examiner*—Jack W. Lavinder
*Attorney, Agent, or Firm*—Lahive & Cockfield

[57] ABSTRACT

The present invention provides an improved cut-off machine wherein the length of an abrasive wheel in contact with a work is easily adjustable. The cut-off machine of the invention includes: a base with fixed and movable vises for clamping a work; a pair of joint members being supported by a pair of brackets projecting from the rear end of the base so as to pivotably move within a predetermined angle; an arm attached to the upper portion of the joint members; an abrasive wheel mounted on one end of the arm for cutting the work; a handle fixed to the arm for operating the arm; a motor attached to the arm for driving the abrasive wheel; and a compression spring spanned between the base and the arm. The upper mounting position of the compression spring on the arm is closer to the brackets, compared with the lower mounting position of the compression spring on the base. The reciprocating movement of the arm moves the abrasive wheel in the horizontal direction to the current optimal cutting position. Such reciprocating movement efficiently prevents undesirable loading of the abrasive wheel and increases the effective cutting width of the abrasive wheel, thus improving the cutting efficiency.

5 Claims, 6 Drawing Sheets

POWER-DRIVEN CUT-OFF MACHINE

BACKGROUND OF THE INVENTION

1. Field of the Invention

The present invention relates to a power-driven cut-off machine, wherein a power-driven rotating abrasive wheel is pressed upon a work, which is clamped by a vise arrangement on a base, through pivotal movement of an arm so as to cut off the work.

2. Description of the Related Art

An example of known cut-off machines, as disclosed in U.S. Pat. No. 2,388,434, includes: a base; a vise arrangement mounted on the upper surface of the base for clamping a work; a bracket projecting from the base; an arm pivotably mounted on the upper end of the bracket; a rotating abrasive wheel attached to the arm; and a spring disposed between the bracket and the arm for pressing the arm in the direction opposite to the work.

In the cut-off machine, an abrasive wheel is pressed upon a work to cut it off. The length of the abrasive wheel in contact with the work is gradually increased as the cutting proceeds, and the cutting resistance is augmented to cause loading. Here the abrasive wheel is only rotatable around the pivotal center of the arm and not movable along a horizontal axis. In the conventional cut-off machine, the operator should shift or change the position or orientation of the work to reduce the contact length of the abrasive wheel.

SUMMARY OF THE INVENTION

The object of the invention is to provide an improved cut-off machine wherein the length of an abrasive wheel in contact with a work is easily adjustable without changing the position or orientation of the work.

The above and other related objects of the invention are realized by a cut-off machine including: a base with a vise arrangement for clamping a work; a pair of joint members being supported by a pair of brackets projecting from rear end of the base so as to pivotably move within a predetermined angle; an arm attached to the upper portion of the joint members; an abrasive wheel mounted on one end of the arm for cutting the work; a handle fixed to the arm for operating the arm; a motor attached to the arm for driving the abrasive wheel; and a pressing member spanned between the base and the arm. The upper mounting position of the pressing member on the arm is closer to the brackets, compared with the lower mounting position of the pressing member on the base.

In the above cut-off machine, the joint members are supported by the brackets projecting from the base to be rotatable within a predetermined angle, and the base end of the arm is mounted on the upper portion of the joint members. The pivotal center of the arm is thereby movable within a predetermined distance along a horizontally extending longitudinal axis.

The pressing member is disposed between the base and the arm in such a manner that the pressing member can apply reaction forces against the pressure of the abrasive wheel upon the work and the force for moving the pivotal center of the arm towards the work while the abrasive wheel is pressed upon the work.

The upper end of the pressing member is attached in the vicinity of the pivotal center of the arm, whereas the lower end thereof is attached to the base at a position closer to the vise arrangement compared with the upper mounting position thereof on the arm. The pressing member thus simultaneously presses the abrasive wheel and the joint members in the direction opposite to the work.

In the cut-off machine of the invention, the abrasive wheel fixed to the arm is movable simultaneously in the horizontal and vertical directions. The reciprocating movement of the abrasive wheel due to the applied force in the horizontal direction changes the length of the abrasive wheel in contact with the work. The joint members frequently move within the predetermined pivotable angle corresponding to the varied balance between the pressure of the abrasive wheel upon the work, the cutting resistance, the force of the pressing member for pressing the joint members towards the brackets. The pivotal movement of the joint members moves the abrasive wheel along the longitudinal axis to the current optimum cutting position.

These and other objects, features, aspects, and advantages of the present invention will become more apparent from the following detailed description of the preferred embodiment with the accompanying drawings.

DESCRIPTION OF THE PREFERRED EMBODIMENT

A cut-off machine embodying the invention is described according to the drawings.

Figure 1:
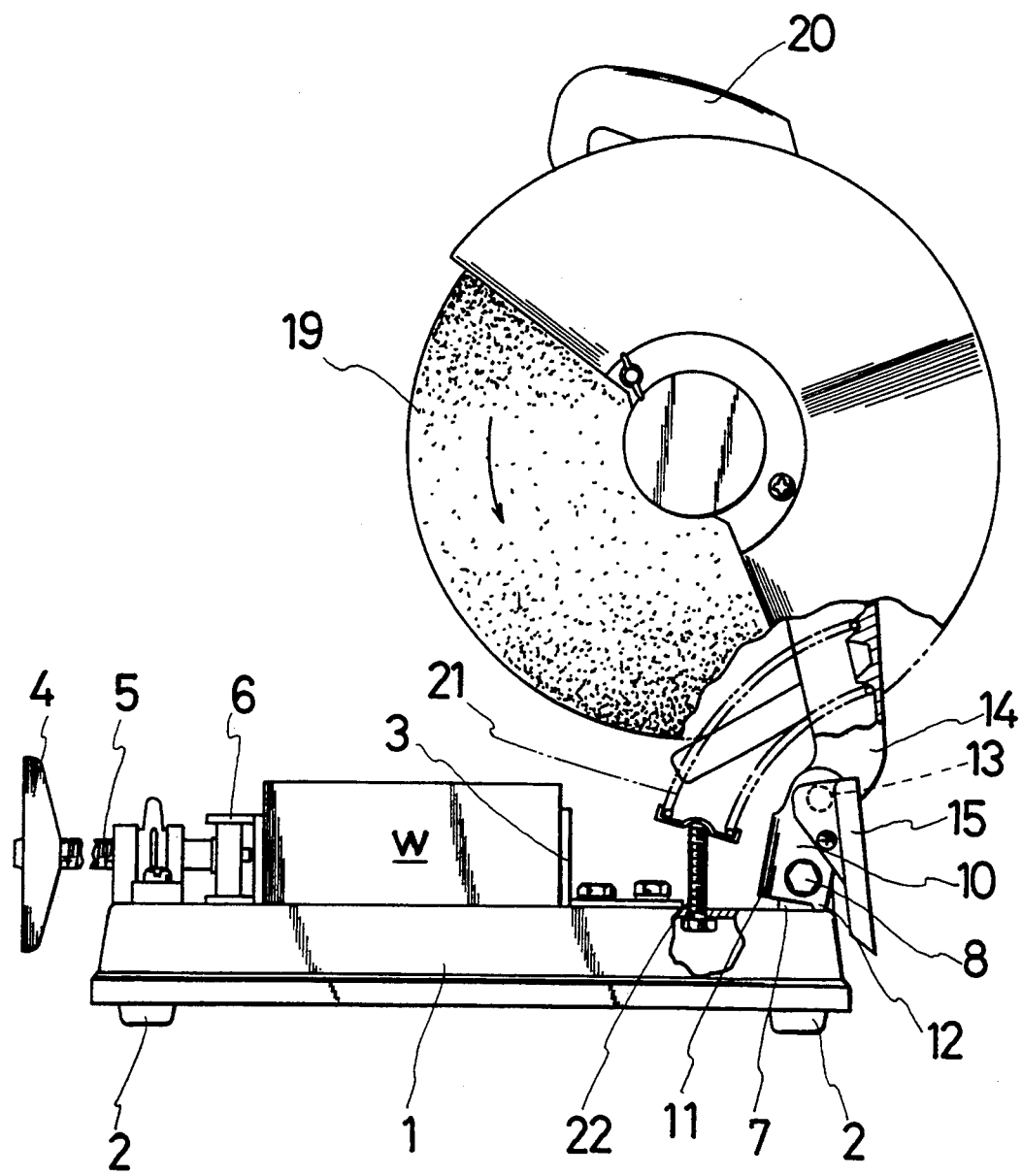
FIG. 1 is a partly broken right side view illustrating a cut-off machine embodying the invention.

The cut-off machine shown in the right side view of FIG. 1 includes a rectangular base 1 having feet 2 on each corner of its lower face. A fixed vise element 3 is securely mounted on the upper face of the base 1 with bolts. A movable vise element 6 is also mounted on the upper face of the base 1, so that a work W is clamped in between the fixed vise element 3 and the movable vise element 6. The position of the movable vise element 5 is adjustable with an adjustment screw 5 having an operating handle 4 on one end thereof.

Figure 2:
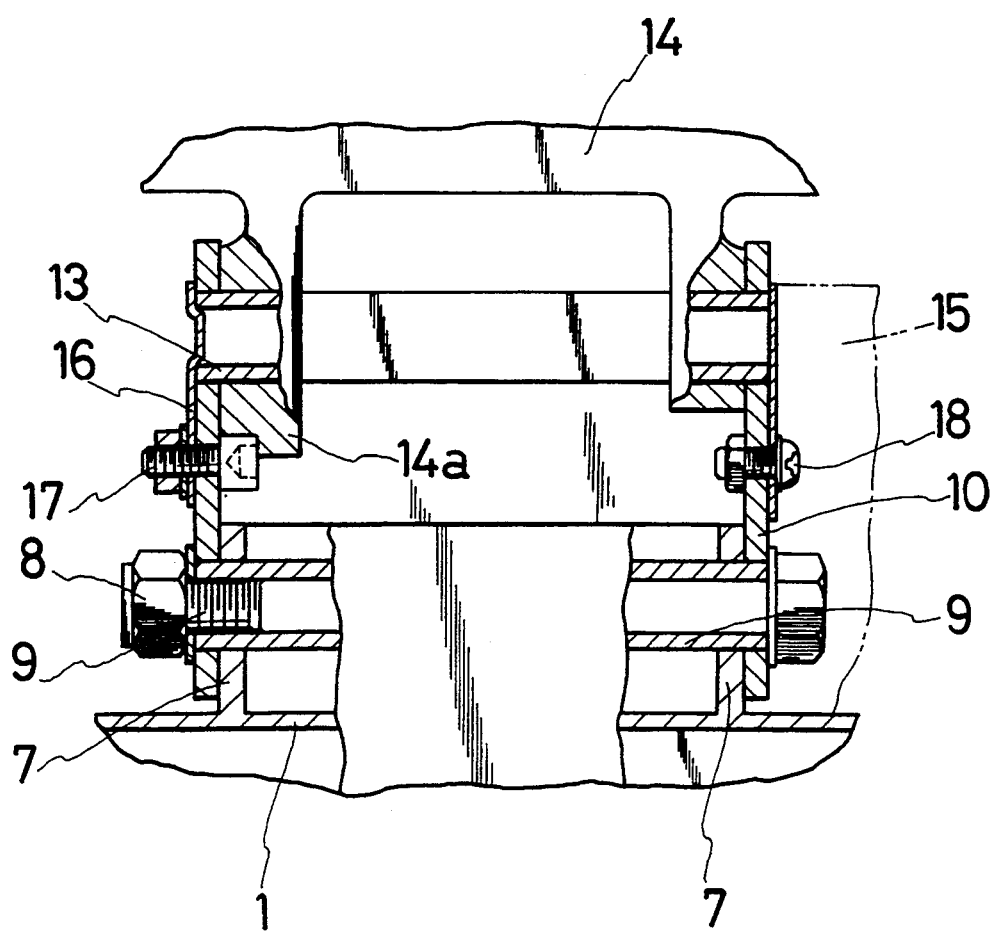
FIG. 2 is a front view showing a joint structure of a base and an arm of the cut-off machine shown in FIG. 1.

A pair of upright brackets 7 project parallel with each other from the rear end of the base 1 as clearly seen in FIG. 1 and the front view of FIG. 2. A pair of joint members 10 are pivotably attached to the brackets 7 via a connection shaft 9 transversely passing through openings formed in the brackets 7 and being bolted with clamping nuts 8. There is a certain space between the lower end face of each joint member 10 and the base 1. A front edge 11 and a rear edge 12 of the lower end face of the joint member 10 are brought into contact with the upper face of the base 1 when the joint member 10 pivots forward. This space allows the joint member 10 to rotate by a small angle. An arm 14 is pivotably mounted on the upper portion of the joint members 10 via a hollow support shaft 13. Covers 15 and 16, which are respectively fixed to the joint members 10 with screws 17 and 18, close the open ends of the hollow support shaft 13 to prevent the support shaft 13 from coming out. The cover 15 also functions as a spark guide as clearly shown in FIG. 1. The head of the screw 17 engages with a protrusion 14a extending from the base end of the arm 14, as shown by the dotted line in FIG. 4, and works as a stopper for limiting upward pivotal movement of the arm 14.

An abrasive wheel 19 with a protecting plate is rotatably supported on the upper end of the arm 14. A handle 20 for moving and operating the arm 14 is further attached to the arm 14.

A compression spring 21 resiliently restores the arm 14 upward when the arm 14 is pivoted downward by a press of the handle 20. The compression spring 21 has an upper end supported by an U-shaped inner wall of the arm 14 and a lower end supported by a mounting member 22 projecting from the upper face of the base 1. In the illustrated embodiment, the upper mounting position of the compression spring 21 on the arm 14 is closer to the brackets 7, compared with the lower mounting position of the compression spring 21 on the base 1.

The mounting member 22 is inserted upward into an aperture formed in the base 1 and upstandingly fixed to the base 1 by means of a screw. The compression spring 21 is easily fixed in a predetermined position according to the following steps: projecting a little length of the mounting member 22 from the base 1; spanning the compression spring 21 between the inner wall of the arm 14 and the tip of the mounting member 22; and fully projecting the mounting member 22 and fixing it with the screw.

Figure 3:
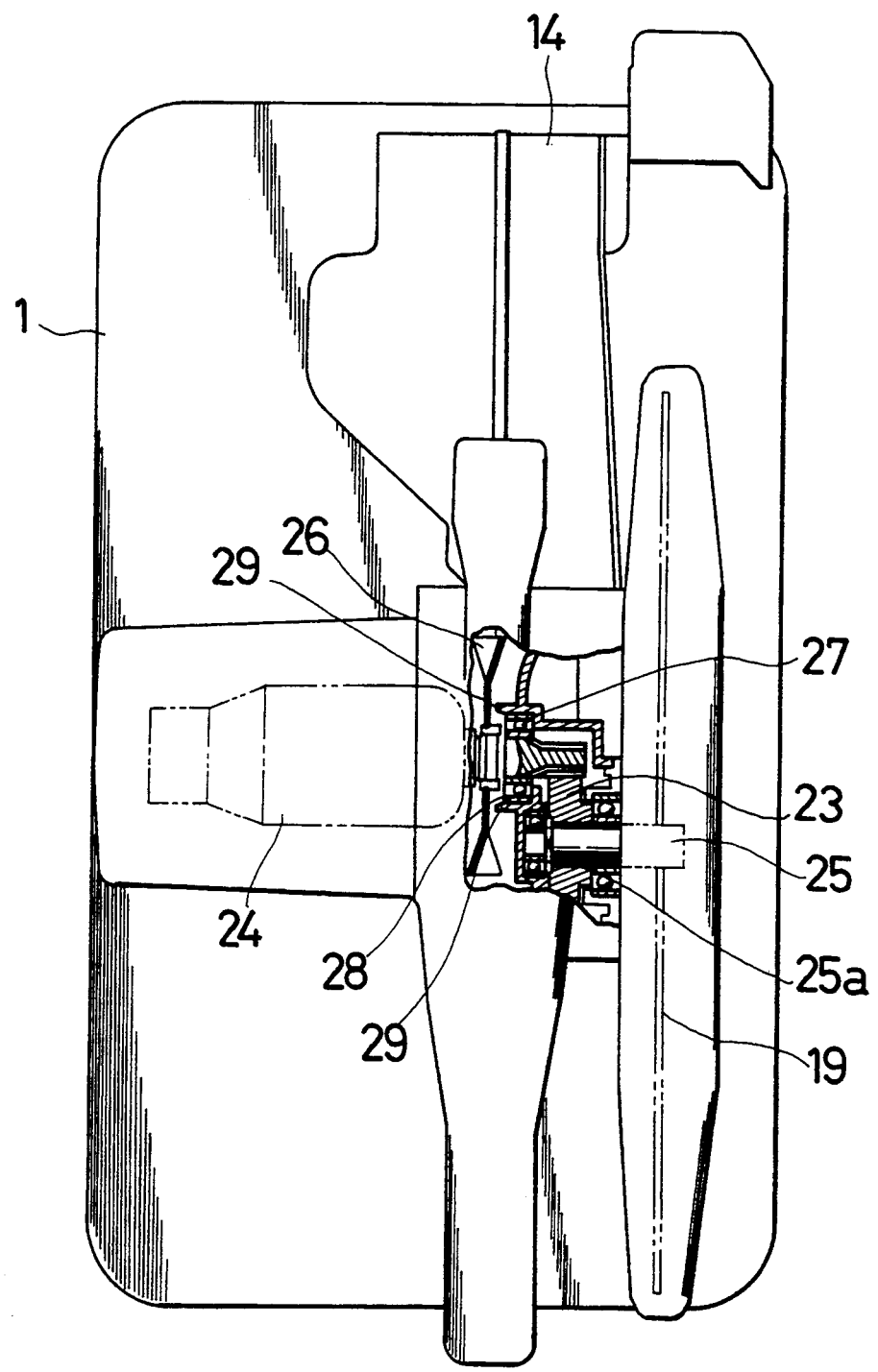
FIG. 3 is a partly broken plan view illustrating the cut-off machine of FIG. 1.

As shown in the plan view of FIG. 3, driving force is transmitted from an output shaft of a motor 24 to the abrasive wheel 19 attached to the arm 14, via a helical gear 23 and a driving shaft 25 of the abrasive wheel 19. In general structure, a gear and a driving shaft are assembled and fixed to each other through engagement of a key with key seat. In the structure of the embodiment, however, the driving shaft 25 is engaged with the helical gear 23 by fitting a chamfered face 25a of the driving shaft 25 into a through hole formed in the helical gear 23. This structure enhances the assembling efficiency and saves the cost required for the key and key seat assembly.

A fan 26 feeds the air to cool the motor 24. A dust shield 28 is attached to protect bearings 27 for supporting the output shaft of the motor 24 from dust contained in the air fed by the fan 26. Protrusions 29 of a gear housing extending between the fan 26 and the bearings 27 prevent dust from being fed to the dust shield 28.

Figure 4:
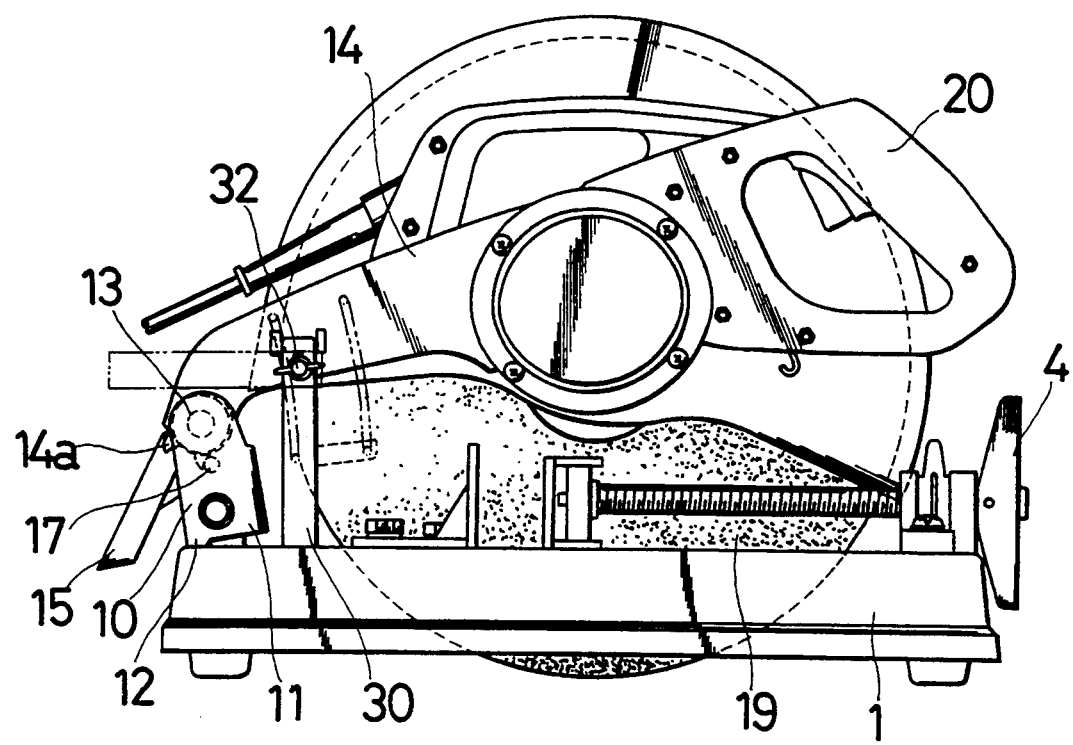
FIG. 4 is a left side view illustrating the cut-off machine with the arm being pressed.
Figure 5A:
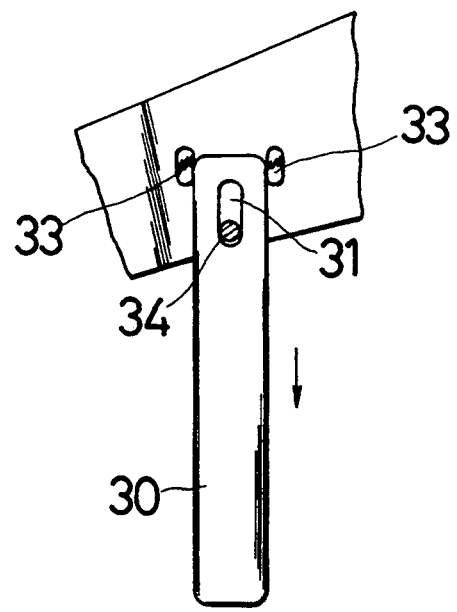
FIGS. 5A and 5B are enlarged views illustrating a stopper mechanism.
Figure 5B:
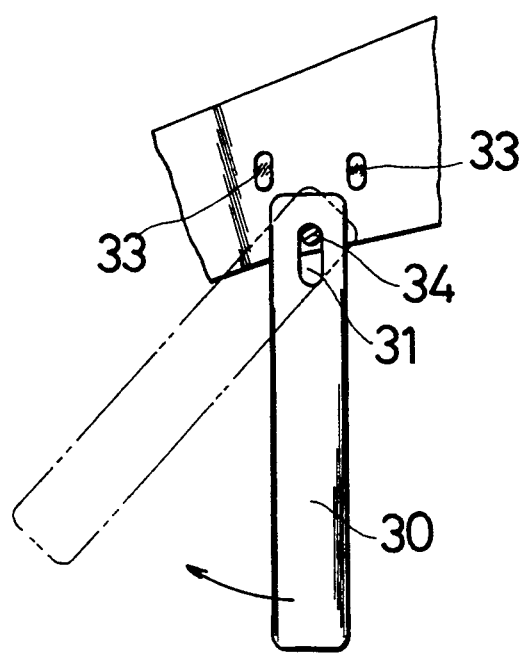

As shown in the left side view of FIG. 4, a stopper 30 hinders an excessive down-press of the abrasive wheel 19 and prevents the abrasive wheel 19 from colliding with the ground and being damaged. The stopper 30 is fixed to the arm 14 by means of a thumbscrew 32 inserted through a slot 31 (see FIGS. 5A and 5B) formed in the upper end of the stopper 30. Anti-slant protrusions 33,33 are formed on both sides of the upper end of the stopper 30 as clearly seen in FIGS. 5A and 5B. In FIGS. 5A and 5B, the head of the thumbscrew 32 for fixing the stopper 30 is omitted.

FIG. 5A shows the stopper 30 in locking position and FIG. 5B in unlocking position. When a threading portion 34 of the thumbscrew 32 is located at the lowermost position of the slot 31 formed in the stopper 30 as shown in FIG. 5A, the upper end of the stopper 30 engages with the anti-slant protrusions 33,33. The engagement prevents slanting movement of the stopper 30 even when the reciprocating movement of the arm 14 along a longitudinal axis of the base 1 extending horizontally brings the lower end of the stopper 30 into contact with the base 1.

When the abrasive wheel 19 is worn by cutting and the arm 14 is to be lowered a little from the initial position for effective cutting, the thumbscrew 32 is loosened and the stopper 30 is pulled down, so that the threading portion 34 of the thumbscrew 32 is located at the uppermost position of the slot 31 shown by the solid line of FIG. 5B. The stopper 30 is then rotated in the direction of the arrow to the position shown by the two-dot chain line of FIG. 5B and fixed to the arm 14 with the thumbscrew 32. The operator can continue cutting the work W with the abrasive wheel 19 while the stopper 30 is in unlocking position.

Figure 6:
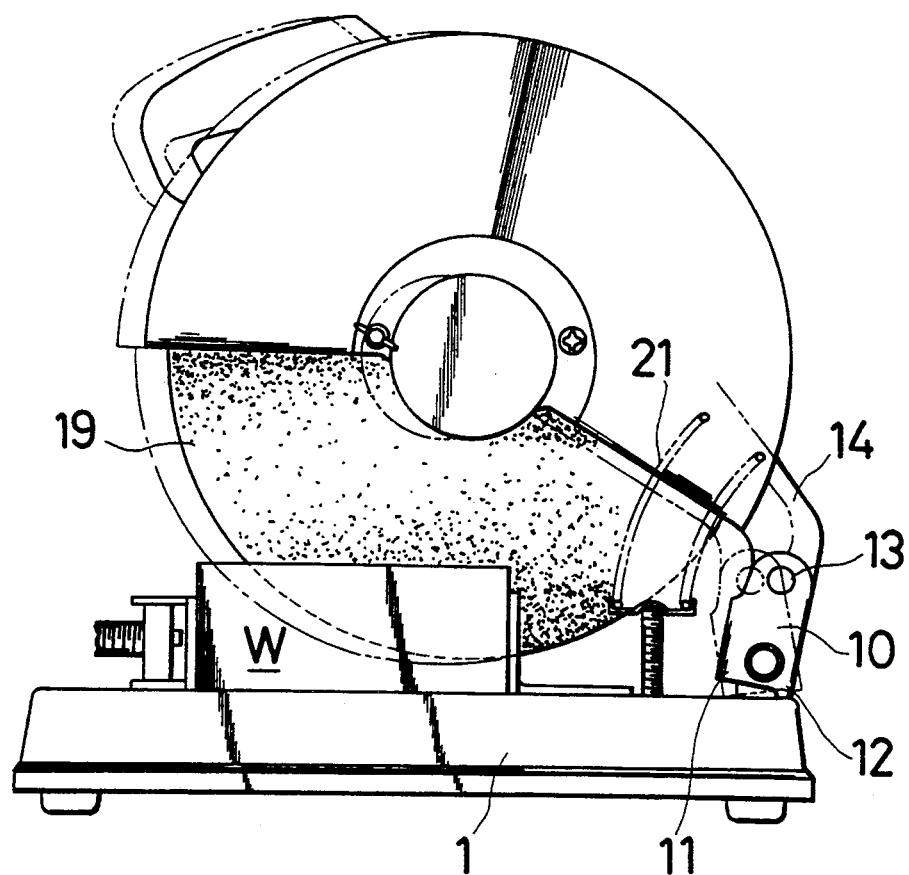
FIG. 6 is a right side view showing the cut-off machine in operation.

Actual operation and effects of the cut-off machine thus constructed are described according to FIG. 6.

As in the case of the conventional cut-off machine, the operator pushes the handle 20 downward against the pressure of the compression spring 21 so as to press the abrasive wheel 19 upon the work W and cut it off. When the width of the work W is a little greater than the effective cutting width of the abrasive wheel 19, the operator moves the abrasive wheel 19 along the longitudinal axis and effectively cuts the work W.

When the width of the work W is within the effective cutting width of the abrasive wheel 19, at the initial stage of cutting, the operator can cut the work W with a little pressing force since the cutting resistance is relatively low. Here the joint members 10 are slant backward as shown by the solid line in FIG. 6. When the length of the abrasive wheel 19 in contact with the work W, i.e. the contact length of the wheel 19, is increased and the cutting resistance is augmented as the cutting proceeds, the operator applies a force in the horizontal direction. The joint members 10 are then slant forward as shown by the two-dot chain line in FIG. 6, and the pivotal center of the support shaft 13 of the arm 14 is moved towards the work W, so that the contact length of the abrasive wheel 19 with the work W is increased. When the contact length is increased again in this forward position, the operator applies a force again in the horizontal direction to slant the joint members 10 backward in the direction opposite to the work W and move the pivotal center of the arm 14 towards the brackets 7 as shown in the solid line in FIG. 6. These reciprocating processes are repeated until the work W is completely cut off.

When the cutting resistance is changed with respect to the pressure against the work W, reaction force due to the cutting resistance becomes unbalanced with the force for moving the joint members. 10 towards the brackets 7, and the pivotal center of the arm 14 is thereby automatically moved. The movement of the pivotal center accordingly moves the arm 14 along the longitudinal axis without an applied force in the horizontal direction. According to the above mechanism, the abrasive wheel 19 of the cut-off machine is repeatedly moved to the current optimal position, i.e. position of least cutting resistance, for efficiently cutting the work W.

As described above, in the cut-off machine of the embodiment, the abrasive wheel 19 is movable simultaneously in the horizontal and vertical directions. The reciprocating movement of the abrasive wheel 19 due to the applied force in the horizontal direction changes the contact length of the abrasive wheel 19 with the work W so as to reduce the cutting resistance and efficiently prevent undesirable loading of the abrasive wheel 19. Such horizontal movement also increases the effective cutting width of the abrasive wheel 19 and improves the cutting efficiency.

Even when the operator does not intentionally apply a horizontal force, the arm 14 automatically moves along the longitudinal axis to move the abrasive wheel 19 to the current optimal cutting position.

In the above cut-off machine, the joint members 10 frequently move within a predetermined pivotable range corresponding to the varied balance between the pressure of the abrasive wheel 19 upon the work W, the cutting resistance, the force of the compression spring 21 for pressing the joint members 10 towards the brackets 7. The pivotal movement of the joint members 10 moves the abrasive wheel 19 along the longitudinal axis to the current optimum cutting position.

The above embodiment is only illustrative and not restrictive in any sense. The structure or shape of each element of the cut-off machine is not limited to the above embodiment but may be modified or changed as long as the above essential characteristics are attained. An example of such modification is given below.

The cut-off machine of the embodiment includes only one compression spring 21 since the compression spring 21 is arranged in such a manner that the upward component of the force of the compression spring 21 for pressing the arm 14 upward acts simultaneously with the horizontal component of the force. The cut-off machine may alternatively include two spring elements for separately applying pressure in upward and horizontal directions.

What is claimed is:

1. A cut-off machine comprising
   a base extending along a longitudinal axis and having an axial back end and having a vise arrangement for clamping a workpiece,
   a pair of joint members having an upper portion and a lower portion and supported by a pair of brackets projecting from the back end of said base, said joint members being pivotably movable relative to said base within a predetermined angle, each of said joint members having two edges spaced apart along the longitudinal axis, the first edge being a front edge of the joint member and the second edge being a rear edge of the joint member, wherein said joint members are alternately movable between a first position at which the first edge is placed in contact with said base upper face and a second position at which the second edge is placed in contact with said base upper face,
   an arm being pivotably attached at one end thereof to said upper portion of said joint members to form a pivotal center, said pivotal center being movable at least along a horizontal plane substantially parallel to said longitudinal axis,
   an abrasive wheel mounted on the other end of said arm for cutting said workpiece,
   a handle attached to said arm for operating said arm,
   a motor attached to said arm for driving said abrasive wheel, and
   a pressing member having an upper mounting end associated with said arm and having a lower mounting end associated with said base, for spanning between said base and said arm and for generally pressing said arm upward.

2. A cut-off machine having a base extending along a longitudinal axis for supporting a workpiece, a hinged blade arm mounting a rotary wheel, a handle fixed to said arm for operating said arm, and a motor for driving said wheel, said machine having the improvement comprising
   means for moving said rotary wheel for a limited distance substantially along said longitudinal axis, said means includes
   at least one joint member having first and second ends and hingedly coupled at said first end to said base and hingedly coupled at said second end to said blade arm for mounting said arm relative to said base, said joint member first end having opposed front and rear edges, said front edge being selectively spaced from said base to define a rotational space having a predetermined angle for allowing said joint member to rotate within said angle between said base and said front edge,
   each of said joint members having two edges spaced apart along the longitudinal axis, the first edge being the front edge of the joint member and the second edge being the rear edge of the joint member, wherein said joint members are alternately movable between a first position at which the first edge is placed in contact with said base upper face and a second position at which the second edge is placed in contact with said base upper face.

3. A machine according to claim 2, wherein said blade arm includes
   a rotary shaft having a first end and a chamfered second end, and
   a helical gear having a through hole for matingly receiving said chamfered second end of said shaft, wherein said rotary wheel is coupled with said motor via said rotary shaft and said helical gear.

4. A machine according to claim 2 further comprising
   a stopper element having an upper portion and a lower portion, said stopper element being coupled to said blade arm for limiting the movement of said rotary wheel in a direction that decreases the spacing between said rotary wheel and said base, and
   a plurality of anti-slant protrusions mounted on said blade arm, wherein at least one of said protrusions is disposed on one side of said stopper element and at least another of said protrusions is disposed on an opposing side of said stopper, for maintaining said stopper element in a normally vertical position relative to said base.

5. A machine according to claim 4, wherein said stopper element is alternately disposable between a locked position and an unlocked position, said upper portion of said stopper element abuts said anti-slant protrusions in said locked position, and said upper portion of said stopper is free of said protrusions in said unlocked position.

* * * * *